Figures 1, 2:
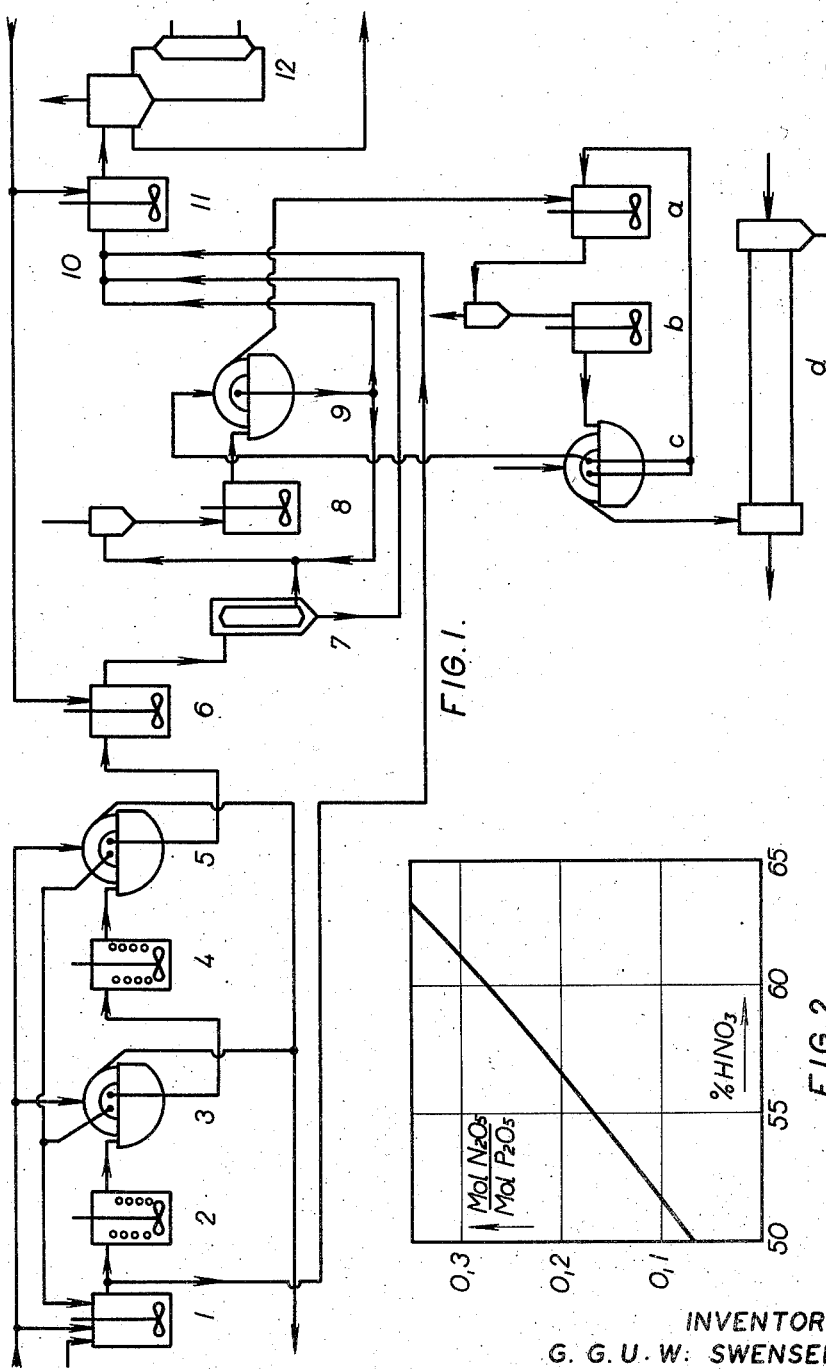

INVENTORS
G. G. U. W. SWENSEN &
J. R. L. SWENSEN

2,803,531

PROCESS FOR THE PRODUCTION OF MONO-AMMONIUM PHOSPHATE AND OTHER PRODUCTS FROM RAW PHOSPHATE

Gunder Georg Ulrich Wasmuth Swensen and Just Riddervold Lindeman Swensen, Heroya, near Porsgrunn, Norway, assignors to Norsk Hydro-Elektrisk Kvaelstofaktieselskab, Oslo, Norway Application June 17, 1954, Serial No. 437,402

Claims priority, application Norway June 20, 1953

6 Claims. (Cl. 71—39)

The present invention relates to a method of treating raw phosphate for the production of monoammonium phosphate and of a nitrogen-phosphorus-containing fertilizer.

The method is known of bringing into soluble form and then separating the lime and phosphoric acid content of a raw phosphate by the dissolution of the raw phosphate in 35–75% strong nitric acid and the crystallizing out of the main body of the lime therein as calcium nitrate by cooling, whereupon the calcium nitrate is separated from the solution by filtration. It is a known fact that by this means up to 95% of the lime in the raw phosphate can be removed from the phosphate solution.

The solution, after separating off the calcium nitrate, can be processed in various ways. Thus it is known that it can be neutralized with ammonia and then converted into dry state, whereby a mixed fertilizer is obtained in strewable form. If desired it may also be neutralized with suitable quantities of ammonia and thereafter mixed with or subjected to reaction with potassium-containing substances, which may exist in solid or dissolved state, whereupon further treatment with ammonia can be carried out, in so far as complete neutralization has not already been effected.

The method is also known of processing the phosphate solution to ammonium phosphates, the solution being first partially neutralized with ammonia or ammonium carbonate, whereby the lime remaining in the solution forms dicalcium phosphate, which is precipitated together with any iron and aluminium ions present in the solution as phosphates. At the same time the fluorine ions which may be present in the solution will also be precipitated as calcium fluoride.

We have now discovered a method of making pure calcium nitrate, monoammonium phosphate and a nitrogen-phosphorus containing fertilizer. The invention is characterized by a combination of the following features:

(a) Raw phosphate, if necessary calcined is dissolved in nitric acid.

(b) The solution obtained is divided into two parts (A and B) whereof the one (A) is used for the making of ammonium-phosphate, a substantial part of the lime, e. g. 85–95%, in a manner which per se is known, being removed by cooling and crystallizing out of calcium nitrate, the solution neutralized with ammonia, preferably in gaseous form, whereby fluorine and the remaining lime, as well as iron and aluminium, are precipitated in the form of fluoride and phosphate, which are separated off, whereupon monoammonium phosphate is crystallized out by cooling of the solution, recrystallized, washed and dried, while the other part (B) of the nitric acid raw phosphate solution together with the mother liquor from the crystallizing out of the monoammonium phosphate, if necessary together with precipitated fluoride and phosphate of lime, iron and aluminium, is processed in a per se known way to nitrogen-phosphorus-containing fertilizer, viz. complete fertilizer, the ratio A:B being so selected that a fertilizer is obtained with the desired proportion $N:P_2O_5$.

In dissolving the raw phosphate in nitric acid it is preferable to use nitric acid in an amount which exceeds the equivalent amount of calcium in the raw phosphate by at least 0.15 mol $N_2O_5$ per mol $P_2O_5$ in the raw phosphate. There is used, as per se is known, nitric acid of a concentration between 53 and 63% by weight, preferably about 58% by weight.

In order to get the fluorine content of the solution as far as possible complete in the form of practically insoluble calcium fluoride, so much lime is removed from the solution A in the form of nitrate that the content of lime in the solution is at least equivalent to its content of fluorine ions.

Owing in part to the voluminous character of the precipitated monoammonium phosphate, it has been found advantageous to conduct some of the mother liquor, after separation of the crystallized monoammonium phosphate, back to the stage in the process where the monoammonium-phosphate-containing solution is cooled for crystallization.

If the precipitated fluorides and phosphates of lime, iron and aluminum contain large quantities of fluoride, it is advantageous, in order to get as little as possible fluorine in the fertilizer, after treatment of the precipitated impurities with a mineral acid and separation of calcium fluoride and other insoluble components, first to unite the rest (filtrate) with the other part (B) of the nitric acid raw phosphate solution.

The solution, after the calcium-nitrate-tetrahydrate has been separated off, is suitable and in per se conventional way given an addition of ammonia in gaseous form. The heat which is developed during the reaction between the ammonia and the phosphoric acid-containing solution, is utilized for evaporation of water from the solution.

By varying the amount of that part of the solution of raw phosphate in the nitric acid which is added to the mother liquor after separation of the monoammonium phosphate, it is possible to obtain a fertilizer with a desired ratio between N and P. If desired, it is possible by mixing or reacting this Ca-, N- and P-containing mixture with potassium-containing salts to get a complete fertilizer containing the most important plant-nutritive substances.

By the method which is the subject of the application we have succeeded in arriving at a technical process which affords many advantages compared with the processes hitherto known.

By a process in which nitric acid is used as dissolution agent for the raw phosphate we have succeeded in producing, besides valuable calcium nitrate and a fertilizer containing the plant-nutritive substances nitrogen and phosphorus, at the same time also pure monoammonium phosphate practically free from fluorine. The latter product can be utilized, in addition to the fertilizer industry, in the production of technically pure phosphates, viz. sodium phosphate and sodium polyphosphates for the modern washing agent industry. Or the product can be used in the production of fluorine-free dicalcium-phosphate which is utilized as a feeding phosphate. A further advantage is that the process is very elastic, it being possible by varying the quantitative proportion between that part of the raw phosphate solution from which the monoammonium phosphate is produced and that part of the raw phosphate solution which is added to the mother liquor, after separation of the monoammonium phosphate, to vary considerably the proportion between produced monoammonium phosphate and mixed fertilizer, and the composition of the mixed fertilizer.

An advantage of considerable importance in the process according to the invention is that it is possible to make use of low percentage and therefore cheap raw phosphates and yet produce a technically pure phosphate, with simultaneous production of calcium nitrate and valuable N- and P-containing fertilizer.

A further advantage of great value for the economy of the process is that, by reason of its character, it affords good conditions for effecting an extensive automatic operational control and energy-saving heat exchanges. Moreover, each single stage of the process represents relatively well known individual operations, which do not offer therefore any great problems for a successful carrying out of the process.

By cooling the raw phosphate solution to, for example, −10° C. it is possible to obtain a thorough separation of the lime and phosphoric acid content of the raw phosphate, up to 95% of the lime being obtainable as crystalized calcium-nitrate-tetrahydrate, while the phosphorus content will be left in the solution.

The percentage of the phosphorus content of the raw phosphate which can be converted to technically pure ammonium phosphate will depend entirely on the demands made on the N/P$_2$O$_5$ ratio in the mixed fertilizer obtained by the combined process in addition to the monoammonium phosphate. With an N/P$_2$O$_5$ ratio equal to 0.96, about 40% of the phosphorus content of the raw phosphate can be converted to monoammonium phosphate. Theoretically there is no limit to how far it is possible to go in the direction of converting the P-content of the raw phosphate to monoammonium phosphate.

Referring to the accompanying sheet of drawing:

Fig. 1 shows diagrammatically a plant for carrying out the process according to the invention, the process steps 1–12 and a–d referred to in the following description of the process being denoted on this figure of drawing by the corresponding numerals and letters; and Fig. 2 is a graphical representation of a curve showing how the lower limit of the excess of nitric acid used in the process is dependent on the concentration of the nitric acid, the lower limit of this excess, expressed as mol N$_2$O$_5$ per mol P$_2$O$_5$ in the raw phosphate, being shown as ordinate and the nitric acid concentration being shown as abscissa. As the individual steps are, as stated above, familiar separate operations, detailed description is unnecessary. What is stated is to be regarded as illustrative only.

(1) Decomposition of raw phosphate in conventional manner with nitric acid in an amount which is equivalent to the lime content of the raw phosphate. An excess of nitric acid should be used of at least 0.15 mol N$_2$O$_5$ per mol P$_2$O$_5$ in the raw phosphate, to prevent precipitation of monocalcium phosphate. The nitric acid concentration should be 53–63% by weight, and the minimum amount of the excess which must be used for preventing precipitation of the monocalcium phosphate will depend on the nitric acid concentration. The lower limit of this excess of nitric acid will appear from the curve in Fig. 2. The developed reaction heat is utilized, for instance for pre-heating of the cooled solution from step 5.

About 20% of the solution is conveyed directly to step 10 for production of N- and P-containing fertilizer, while about 80% of the solution is carried to step 2.

(2) About 80% of the solution is cooled down to about 18° C., at which temperature the calcium-nitrate-tetrahydrate is crystallized out.

(3) The crystallized salt is strained off in a rotatory vacuum filter, preferably fitted with an acid-resistant metal screen, for example with mesh of about 0.5 mm., and the salt is washed in the filter with decomposition acid. Used washing acid is utilized in the dissolution of the raw phosphate (step 1). If out of regard for the further processing it is desired to obtain the calcium nitrate with the minimum content of nitric acid, the salt is finally washed with water.

(4) The solution from step 3 is artificially cooled to about −10% C., whereby further quantities of calcium-nitrate-tetrahydrate are crystallized out.

(5) The salt is strained in a rotatory vacuum filter, where it is treated as indicated in step 3.

(6) The solution is neutralized in conventional manner partially with gaseous ammonia, whereby the temperature of the solution rises to boiling point, and some water is evaporated. The content of lime and fluorine ions in the solution is precipitated as calcium fluoride and calcium phosphate, and the precipitation carries at the same time with it the solution's content of iron and aluminium as phosphates.

(7) The fluoride, and phosphate-containing sludge, which contains the impurities and insoluble components (gangue) of the solution is filtered off. For this filtration it is advantageous to use a pressure filter. The sludge filtered off can be removed from the process or, if desired, be added to step 10, whereby the phosphorus content is utilized.

It is possible of course to treat the sludge with a mineral acid, with a view thereby to dissolve the valuable phosphorus content, after which the worthless and acid-insoluble constituents (+ gangue) are removed.

(8) The filtrate, which is now free from impurities and is practically free from Ca-ions, is cooled to about 40° C., whereby the monoammonium phosphate is crystallized out. Mother liquor from step 9 is recirculated in order to dilute the crystal suspension.

(9) The monoammonium phosphate suspension is filtered in a rotatory vacuum filter. The phosphate is washed with mother liquor from the recrystallization of the monoammonium phosphate. Owing to the voluminous character of the monoammonium phosphate some of the mother liquor from this filtration (equivalent to about 100% of the net liquor production) is recirculated to the crystallisator for the monoammonium phosphate.

(10) Mother liquor from the monoammonium phosphate filtration step (9) is combined with about 20% of the raw phosphate solution from step 1 and, if necessary, with the fluorine-containing sludge from step 7. As stated in connection with step 7, the fluoride-containing sludge can be treated beforehand with mineral acid (viz. HNO$_3$ or H$_2$SO$_4$), whereby the phosphate content of the sludge is caused to dissolve as phosphoric acid, which is thereupon added to the process. By this means the P-content of the raw phosphate is utilized in full, it being only the insoluble and worthless constituents (CaF$_2$ and raw phosphate gangue) which are taken out of the process.

(11) The mixture from step 10 is then neutralized with a base obtained from the group comprising ammonia, ammonium carbonate, alkali-hydroxide, alkali-carbonate, earth-alkali-hydroxide, earth-alkali-carbonate, calcium oxide, limestone and dolomite, all dependent on what composition is desired in the nitrogen- and phosphorus-containing fertilizer mixture.

(12) The neutralized mixed liquor from step 11 is processed further in conventional manner to finished fertilizer containing Ca, P and N. By adding in a known way a potassium salt to the mixed liquor, preferably after this has been vaporized, an all-round complete fertilizer is obtained.

The crystallized, filtered and washed raw monoammonium phosphate obtained in steps 8 and 9 is purified by recrystallization and washing. This recrystallization process is in principle known from crystallizing processes for the purification of technical salts, viz. NH$_4$NO$_3$ or NaNO$_3$. For example, the purification of the raw salt to dry and pure monoammonium phosphate can be performed in the following way:

(a) Dissolving of raw ammonium phosphate in washing water from step c, where recrystallized phosphate is filtered and washed. The dissolution is effected by indirect steamheating.

(b) Vacuum cooling of the solution with crystallization of pure ammonium phosphate.

(c) Filtration of pure ammonium phosphate and washing of same with water. The filtrate is used for washing of raw ammonium phosphate in step 9. The washing filtrate is used for dissolving raw ammonium phosphate in the above-mentioned step *a*.

(d) Drying of pure ammonium phosphate.

In the above example we have not mentioned all the possibilities which exist for energy-saving heat exchanges. To get the best possible use of the reaction heat, for example, the highly-cooled solution from step 5 can be heated in counterflow to a hot raw phosphate solution (liquor from step 1).

The individual steps of the process are relatively simple and uniform wet-method operations which in addition afford good conditions for an extensive application of automatic operational control according to familiar principles.

Presuming that 40%, for example, of the P-content of the raw phosphate is converted to technically pure and fluorine-free monoammonium phosphate, with an annual production of 100,000 tons complete fertilizer whereof 75% (chlorine-containing) contains 13.5% N, 6.0% P and 16.0% K, and 25% (chlorine-free) contains 11.5 N, 5.0% P and 17.5% K, the following quantities of products and raw materials will be obtained:

|  | Tons goods per annum | Tons P per annum |
| --- | --- | --- |
| Production in tons per annum: |  |  |
| Complete fertilizer |  |  |
| Complete fertilizer (chlorine-containing) | 75,000 | 4,600 |
| Complete fertilizer (chlorine-free) | 25,000 | 1,300 |
| Complete fertilizer (chlorine-containing+chlorine-free) | 100,000 | 5,900 |
| Monoammonium phosphate | 14,800 | 4,000 |
| Calcium nitrate (15.5% N) | 55,000 |  |
| Raw Materials in tons per annum: |  |  |
| Raw phosphate | 58,000 | 9,900 |
| Potassium chloride | 24,000 |  |
| Potassium sulphate | 11,000 |  |
| Total NH₃ consumption, direct and for prod. of HNO₃ | 30,500 |  |

The monoammonium phosphate which is produced according to the invention satisfies the requirements laid down for a technically pure product. The average composition of the salt is 61% $P_2O_5$ and 12% N, and it can easily be converted, according to conventional methods, to other valuable phosphates, for example diammonium phosphate, alkali phosphates and earth alkali phosphates.

We claim:

1. The process of obtaining substantially fluorine-free monoammonium phosphate and nitrogen-phosphorus fertilizer from raw phosphate which comprises the following steps: (1) treating the raw phosphate with nitric acid of a concentration of from 53% to 63% in an amount which exceeds the equivalent amount of calcium in the raw phosphate by at least 0.15 mols $N_2O_5$ per mol of $P_2O_5$ in the raw phosphate; (2) dividing the solution obtained by step (1) into two portions in the ratio of about 80% (A) to 20% (B); (3) cooling portion (A) to a temperature of about −10° C. to crystallize up to about 95% of the calcium content thereof as calcium nitrate tetrahydrate and separating the crystals to obtain phosphorus-containing filtrate (A); (4) neutralizing filtrate (A) with sufficient gaseous ammonia to precipitate a sludge containing calcium fluoride and calcium, iron, and aluminum phosphates, and to form a solution containing monoammonium phosphate, and then removing the sludge therefrom; (5) cooling filtrate (A) to about 40° C. to crystallize therefrom substantially fluorine-free monoammonium phosphate, and separating the crystals; (6) adding residual filtrate (A) to portion (B); (7) treating the sludge obtained in step (4) with a mineral acid to dissolve the phosphate content thereof as phosphoric acid and to separate the same from insoluble calcium fluoride and other insoluble impurities, and then adding said acid solution to portion (B); and (8) neutralizing portion (B) with an alkali to obtain a fertilizer mixture containing nitrogen and phosphorus.

2. The process of claim 1 in which a potassium salt is further added to portion (B) to obtain a fertilizer mixture containing nitrogen, phosphorus, and potassium.

3. The process of obtaining substantially fluorine-free monoammonium phosphate and nitrogen-phosphorus fertilizer from raw phosphate which comprises the following steps: (1) treating the raw phosphate with nitric acid of a concentration of from 53% to 63% in an amount which exceeds the equivalent amount of calcium in the raw phosphate by at least 0.15 mol $N_2O_5$ per mol of $P_2O_5$ in the raw phosphate; (2) dividing the solution obtained by step (1) into two portions (A) and (B), the ratio of said portions being determined in accordance with the desired ratio of nitrogen to phosphorus in the final fertilizer mixture; (3) cooling portion (A) to a temperature of about −10° C. to crystallize up to about 95% of the calcium content thereof as calcium nitrate tetrahydrate and separating the crystals to obtain phosphorus-containing filtrate (A); (4) neutralizing filtrate (A) with sufficient gaseous ammonia to precipitate a sludge containing calcium fluoride and calcium phosphate, iron phosphate, and aluminum phosphate, and to form a solution containing monoammonium phosphate, and then removing the sludge therefrom; (5) cooling filtrate (A) to crystallize therefrom substantially fluorine-free monoammonium phosphate, and separating the crystals; (6) adding to residual filtrate (A) the sludge obtained in step (4) and the portion (B); and (7) neutralizing the mixture obtained in step (6) with an alkali to obtain a fertilizer mixture containing nitrogen and phosphorus.

4. The process of claim 3 in which a potassium salt is further added to the mixture obtained in step (7) to obtain a fertilizer mixture containing nitrogen, phosphorus, and potassium.

5. The process of claim 3, in which the sludge obtained in step (4) is treated with a mineral acid to dissolve the phosphate content thereof as phosphoric acid and to separate the same from insoluble calcium fluoride and other insoluble impurities prior to its addition to the residual filtrate (A) in step (6).

6. The process of claim 3 in which portions (A) and (B) are in the ratio of 80% (A) to 20% (B).

References Cited in the file of this patent

UNITED STATES PATENTS

| 1,834,454 | Johnson | Dec. 1, 1931 |
| 1,856,187 | Johnson | May 3, 1932 |
| 1,876,501 | Johnson | Sept. 6, 1932 |
| 1,983,024 | Foss | Dec. 4, 1934 |